July 28, 1925.

H. G. CARLSON

METHOD OF MAKING FLIERS

Filed March 19, 1924     7 Sheets-Sheet 1

1,547,361

Inventor.
H. G. Carlson
By Attorneys
Southgate & Southgate.

July 28, 1925.

H. G. CARLSON

METHOD OF MAKING FLIERS

Filed March 19, 1924 7 Sheets-Sheet 2

Inventor
H. G. Carlson

July 28, 1925. 1,547,361
H. G. CARLSON
METHOD OF MAKING FLIERS
Filed March 19, 1924 7 Sheets-Sheet 3

Inventor.
H. G. Carlson.
By attorneys
Southgate & Southgate

Witness

July 28, 1925.

H. G. CARLSON

METHOD OF MAKING FLIERS

Filed March 19, 1924     7 Sheets-Sheet 6

1,547,361

Patented July 28, 1925.

1,547,361

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING FLIERS.

Application filed March 19, 1924. Serial No. 700,390.

*To all whom it may concern:*

Be it known that I, HJALMAR G. CARLSON, a citizen of the United States, residing at Worcester, in the county of Worcester and State of Massachusetts, have invented a new and useful Method of Making Fliers, of which the following is a specification.

This invention relates to the manufacture of a flier for a textile machine out of a single piece of metal and by means of metal pressing and rolling operations.

The principal object of the invention is to provide a method by which a perfectly balanced and accurately constructed flier can be manufactured from a flat blank of metal. The invention also involves the rolling out of one end of the blank to form the balancing of the flier, the rolling out of the other end of the blank to form a flat end and then rolling up the flat end to form the thread guide and to provide for leaving the metal in the right shape so that the center or crown of the flier can be formed by simple metal pressing operations from the same piece of stock and then curved to bring the thread guide and balancing rod into parallel position.

Other objects and advantages of this invention will appear hereinafter.

Reference is to be had to the accompanying drawings, in which.

This invention relates to the manufacture of a flier, particularly of the type shown on the last sheet of drawings. It is well understood that several attempts have been made to manufacture these fliers of pressed metal because of the large amount of fine hand work and machine work required at the present time to manufacture them and get them into proper balance. These attempts have not hitherto proved practically successful. The present invention relates to the manufacture of such a flier in which the balance rod and thread guide are formed from a single piece of metal, the two ends being worked on at different times to bring them into proper shape. This invention involves the formation of all the features of the flier except the central bearing stem from a single piece of metal in such a way as to require a minimum of final hand work to polish and balance the parts after the flier is formed.

Figures 1, 2, 3, 4, 5, 6, 7, 8, 9, 10, 13:
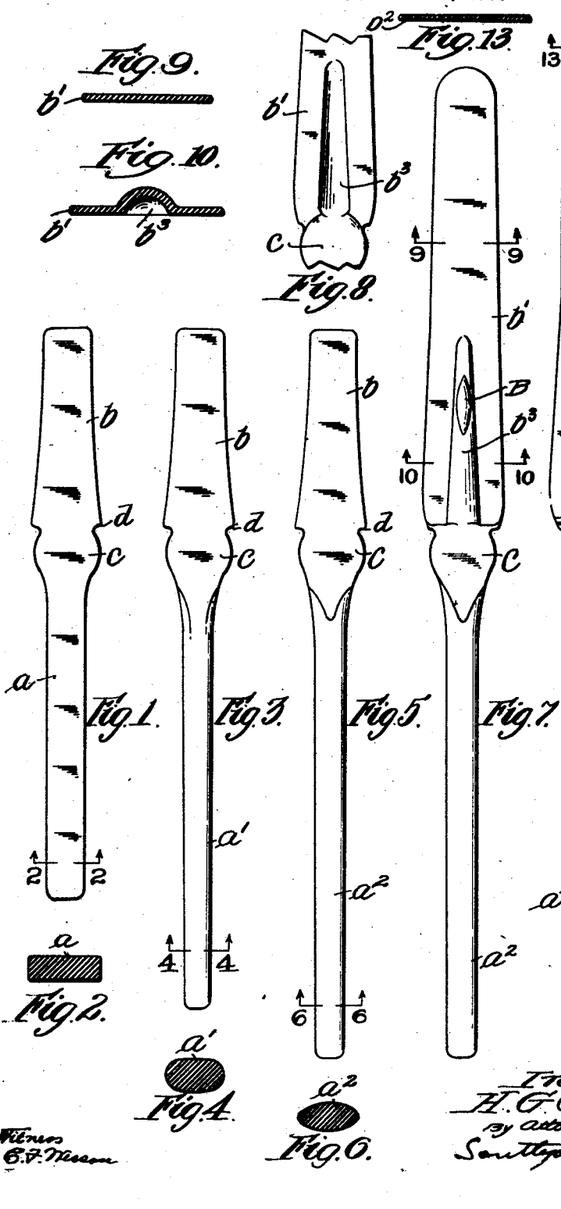
Fig. 1 is a face view about half size of a blank of sheet stock cut out to the shape required for the starting of this process.
Fig. 2 is a full size cross sectional view on the line 2—2 of Fig. 1.
Fig. 3 is a view similar to Fig. 1 showing the result of the first rolling operation on the balance rod end of the blanks.
Fig. 4 is a full size cross sectional view on the line 4—4 of Fig. 3.
Fig. 5 is a view similar to Fig. 3 showing the result of the second rolling operation.
Fig. 6 is a full size cross sectional view on the line 6—6 of Fig. 5.
Fig. 7 is a view similar to Fig. 5 showing the result of the first or hot rolling operation on the other or thread guide end of the blank.
Fig. 8 is a fragmentary view showing the opposite side from that shown in Fig. 7.
Figs. 9 and 10 are full size cross sectional views on the lines 9—9 and 10—10 respectively of Fig. 7.
Fig. 13 is a cross sectional view of the same on the line 13—13 of Fig. 11.

This invention starts with the punching out by punching dies of a blank of the shape shown in Fig. 1 and having the cross section indicated in full size in Fig. 2. This is cut out of sheet or strip metal, as may be desired. The part of the blank marked $a$ is intended to be used for making the balance rod while the part marked $b$ is used for making the thread guide. The shape of this blank is important as it provides the part $a$ in the form of a long rod rectangular and uniform in cross section. This widens out at the end to form a substantially circular center at $c$. At the opposite side of this it widens out abruptly to form two abrupt shoulders $d$ and the part $b$ which extends from the shoulders $d$ to the opposite end gradually narrows down toward that end but it is not as narrow at any point as the part $a$. This is a flat blank of uniform thickness throughout.

Figure 14:
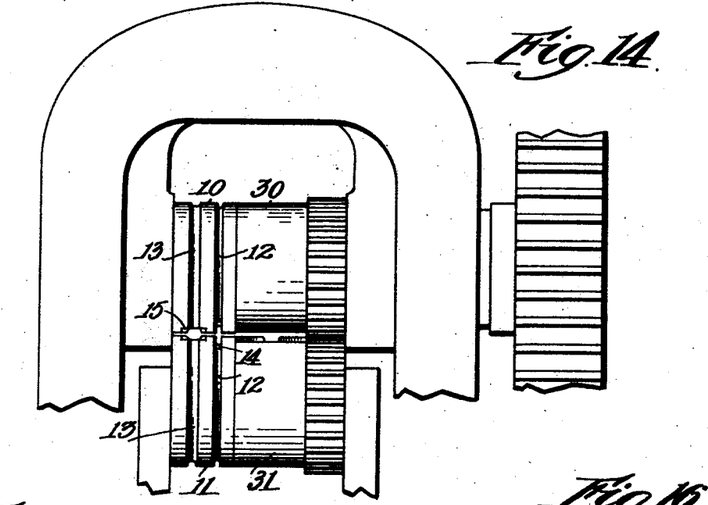
Fig. 14 is a reduced front elevation of a pair of rolls designed for performing the operations, the results of which are indicated in Figs. 3 and 5.
Figures 15, 16:
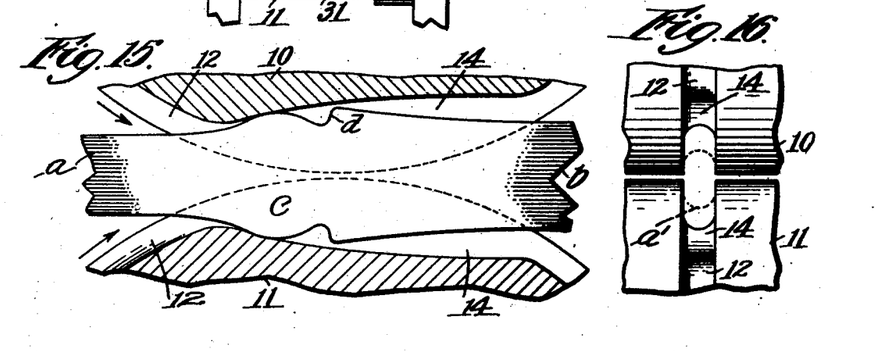
Fig. 15 is a full size sectional view through one pair of shaping grooves of said rolls, showing the blank in position.
Fig. 16 is a full size front view of the same.

The next operation is to put the end $a$ of the cold blank shown in Figs. 1 and 2 into a pair of rollers 10 and 11 (Fig. 14) on an ordinary rolling machine. These rolls have registering grooves 12 of the same size and shape and as shown in Fig. 16 they receive the blank set up edgeways between them and roll it out from the rectangular form shown in Fig. 2 to the flat form with rounded edges shown in Fig. 4. Both these figures can be considered as full size, as that is a convenient size for use. These rolls are arranged to rotate a complete revolution and then stop automatically in the position shown in Figs. 15 and 17. The operator grasps the end $b$ of the blank in his hand and puts it into the rolls to the point shown in Fig. 15. Then he starts the machine. The rolls, turning as the arrows indicate, push the blank out toward the front. By this operation the end $a$ of the blank is lengthened out to the length indicated and left in the form shown at $a'$ in Fig. 3.

Figure 17:
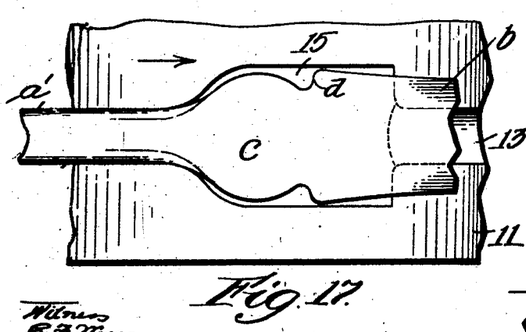
Fig. 17 is a plan of a groove of the other pair shown in Fig. 14.
Figure 18:
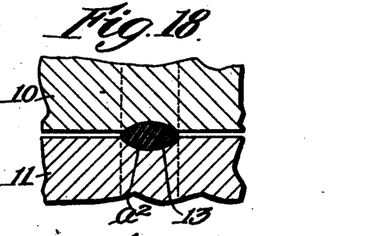
Fig. 18 is a sectional view of the two rolls.
Figures 44, 46, 47, 48, 49:
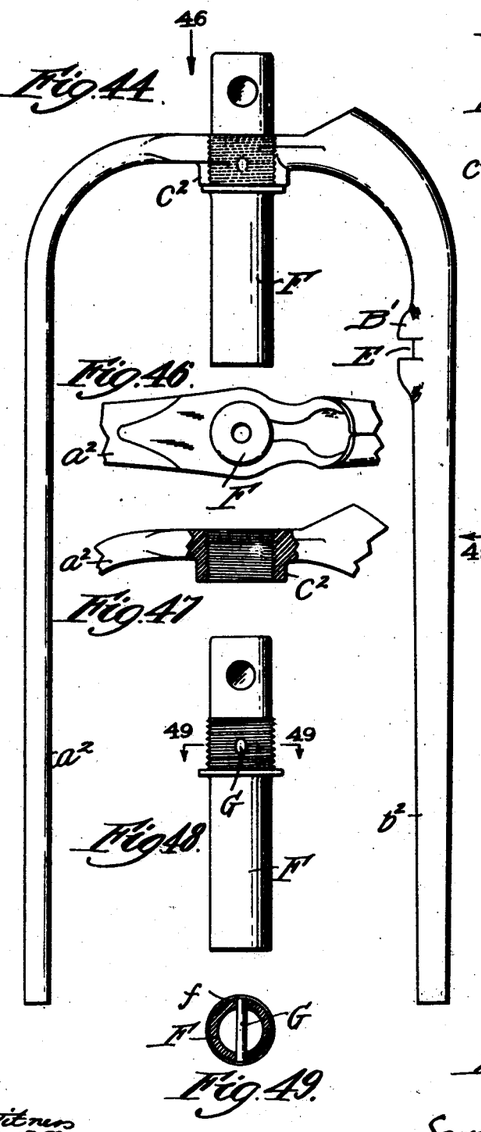
Fig. 44 is a full size side view of the completed flier.
Fig. 46 is a fragmentary plan of the same looking in the direction of the arrow 46 in Fig. 44.
Fig. 47 is a fragmentary side view of the same showing parts of the device in central section.
Fig. 48 is a view of the bearing taken out of the flier.
Fig. 49 is a sectional view on the line 49—49 of Fig. 48.

The blank is again taken by the end $b$ and put, cold, in between a pair of grooves 13 on the same rolls, but it is turned over flatwise as indicated in Fig. 18 and reduced in the same way to the practically elliptical cross section shown in that figure and in Fig. 6, while the part $a'$ of the blank shown in Fig. 3 is lengthened out and thinned to the condition shown at $a^2$ in Fig. 5. Fig. 17 shows the commencement of the operation shown in Figs. 18, 5 and 6. It will be noted that the grooves 12 and 13 respectively extend all the way around the rolls and that there are enlargements 14 and 15 respectively in the rolls for receiving the part $c$ of the blank when the rolling operation starts. These operations constitute practically the entire process of shaping and finishing the balance rod $a^2$ of the completed article as shown in Fig. 44.

Figures 19, 22:
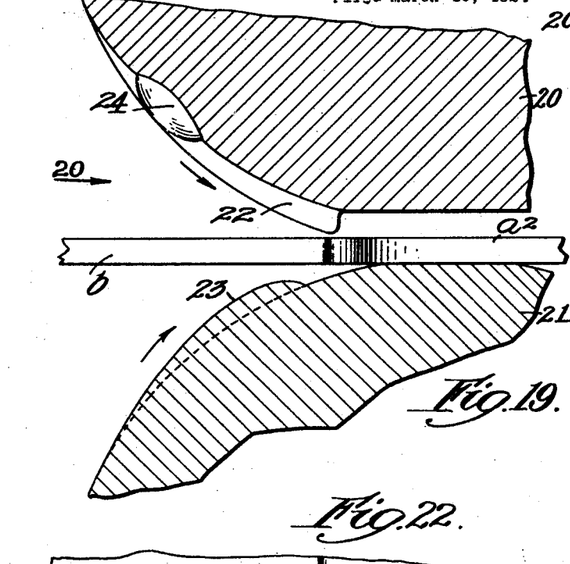
Fig. 19 is a sectional view through the rolls showing part of the hot rolling process resulting in the form shown in Fig. 7.
Fig. 22 is a view looking down on the lower roll as indicated by the arrow 22 of Fig. 21.
Figure 20:
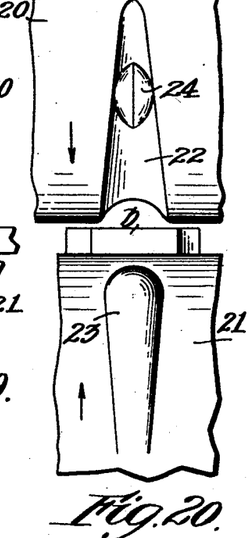
Fig. 20 is a rear view of the same looking in the direction of the arrow 20 of Fig. 19.
Figure 21:
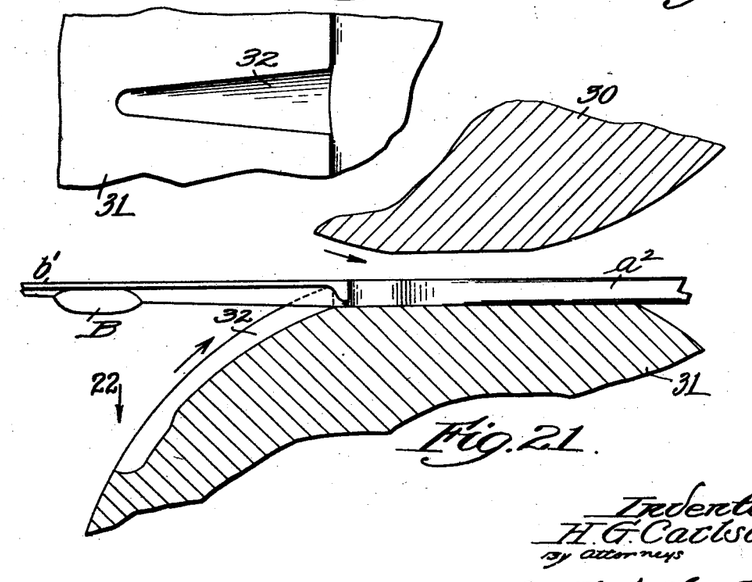
Fig. 21 is a view similar to Fig. 19 showing the next rolling operation.

For the next operation the blank is heated. The temperature to which it is heated depends upon the condition of the carbon in the metal and it is sufficient to say that it is heated enough to permit of the severe rolling operation which is next to take place on the end $b$ of the blank. This is performed in a pair of rollers 20 and 21 shown in Figs. 19–22. These rollers have a groove and projection 22 and 23 which are not just alike, having the relation of male and female. The groove 22 in the roller 20 is of a general triangular shape rounded at the end which is provided with a depression 24 extending practically all the way across it at the point indicated in Fig. 20. The roller 21 is provided with a projection 23 of a similar shape but not identical. It is without any part corresponding with the depression 24. The blank, heated as specified, is grasped by the end $a^2$ as a handle and put into this pair of rolls as far as indicated in Fig. 19 and then rolled out forwardly in the same way, as is indicated above. As the rolls turn so that the parts just described come together, the part 22 first engages the blank and then the part 23 comes into contact with it on the other side. The result of this is to transform the shape of the end $b$ of the blank into the shape $b'$ shown in Figs. 7–10 inclusive. This flattens out the blank very materially, reduces its thickness throughout substantially uniformly, widens it out materially and more than doubles the length of that part of the blank, but in addition to that it forms a definite shape on the blank resulting in a longitudinal concavo-convex portion $b^3$ at the center and near the head of this part of the blank, as indicated most clearly in Fig. 10. But this is interrupted at one point by a projection B extending from the convex side of this curve. The groove which appears on one side is of a tapering character, being wider at the head end of this part of the blank or near the central part $c$ and tapers down to the end where it is curved rather abruptly. The concave side of the blank is similar except that the part B does not present any appearance on that side. It is formed from the metal of the blank forced inwardly in these rolls so as to result in a permanent projection at that point for a purpose to be described hereinafter. The blank in this form is now put into a pickel for the removal of the scale formed in the hot rolling process that has just been described. This is the only treatment in a hot condition that is usually necessary throughout this process.

Figures 11, 12:
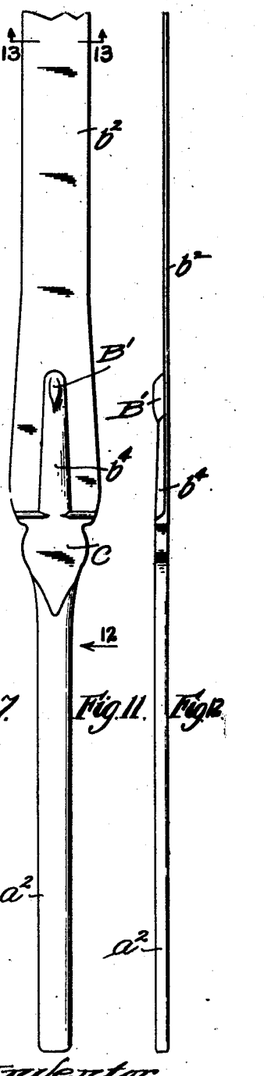
Fig. 11 is a view similar to Fig. 7 showing the result of the next or cold rolling operation on the thread guide end of the blank.
Fig. 12 is an edge view of the same.

Now the blank is put into another pair of rollers 30 and 31, the latter having a groove by which the blank shown in Fig. 7 is changed to the form shown in Figs. 11, 12 and 13. Here this part of the blank $b'$ is changed into the shape shown at $b^2$, greatly lengthened and thinned at its edges and the concave-convex portion $b^3$ just described is shortened up somewhat as shown at $b^4$, slightly modifying the projection B so as to give it the formation shown at B' in these figures. It will be understood that these several operations are performed using the part $a^2$ as a handle and that the blank is manipulated by this handle throughout this period.

Figures 23, 24, 25, 26, 27, 28, 29, 30, 31, 32:
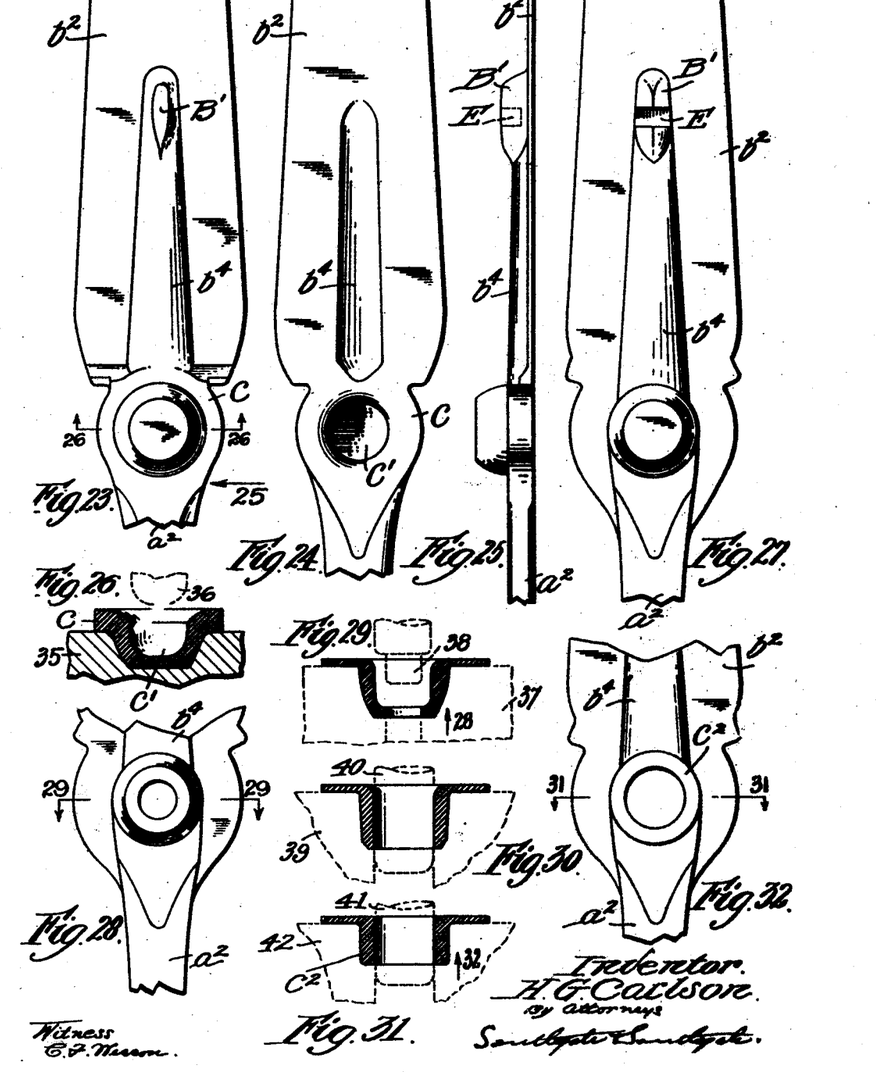
Fig. 23 is a view of a portion of the blank as shown in Fig. 11 with the center of the crown portion depressed to start the formation of a cylindrical hub thereon according to the next step of the operation.
Figs. 24 and 25 are an opposite face and edge view respectively showing the blank in the same condition.
Fig. 26 is a view on the line 26—26 of Fig. 23 and also showing a die in section on the same line to illustrate the formation of the blank in Figs. 23, 24 and 25.
Fig. 27 is a view similar to Fig. 23 showing the shape of the blank as it is further modified by pressing in dies.
Fig. 28 is a view similar to Fig. 27 showing a hole punched through the blank.
Fig. 29 is a sectional view on the line 29—29 of Fig. 28 showing this operation, the dies being shown dotted.
Figs. 30 and 31 are similar views showing further steps in the operation of finishing the hub on the center of the crown of the flier, Fig. 31 being taken on the line 31—31 of Fig. 32 which is a bottom face view of the blank after it reaches the form shown in Fig. 31.

The rolling operations on this blank are now completed. Part of the blank is shown full sized in Fig. 23 but in that figure another operation has been performed by a pressing die 35 and plunger 36, as shown in Fig. 26. The central part $c$ of the blank is pressed and provided with a recess $c'$ having a rounded bottom and a rounded edge. The under side of the blank is left flat with flaring sides but it is to be observed that the part $b^2$ of the blank is not modified. The under side of this blank is left by the dies in Fig. 26, as shown in Fig. 24 and the edge in Fig. 25, Fig. 25 showing at E in dotted lines the position in which a groove having the same designation in Fig. 27 is made in the projection B' by a very simple die after the operation shown in Fig. 26. This operation, however, could be performed either before or after the next operation, as desired, as it has no effect on any part except to form this groove E across the projection B'. In the finished article this constitutes the groove for receiving the end ring of the presser, not shown.

In Fig. 29 I have shown a die 37 for receiving this blank and a punching die 38 for punching a hole in it. The result is shown in Fig. 28. The next operation is indicated in Fig. 30 in which a die 39 receives the blank and a larger punch 40 punches out the center to a cylindrical form. With a punch 41 like the punch 40 in place in a die 42 which has a different shape from the die 39, the parts are reduced to the shape shown in Figs. 31 and 32 by a die coming down from above, but not illustrated in that figure. Fig. 32 shows the bottom of the blank when reduced to this form and the result is a hollow cylindrical projection $c^2$ on what can be considered the under side of the blank. This projection $c^2$ is the projection which is left on the finished article and is simply screw threaded inside for the reception of the center bearing stem shown on the last sheet, as will appear later. This forms the crown.

Figures 33, 34, 36:
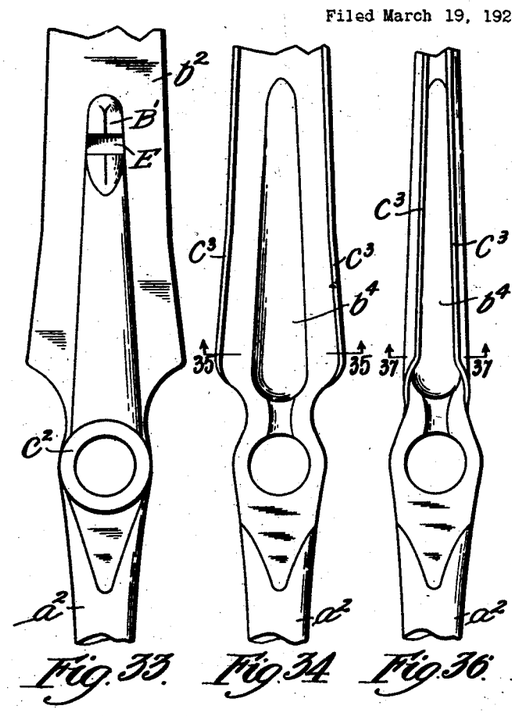
Figs. 33, 34, 36 and 38 are similar views showing four more steps in the operation of forming the thread guide and bending it up into shape.
Figure 35:
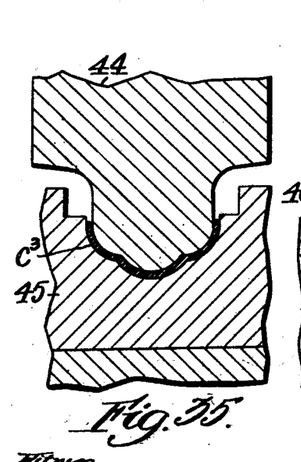
Fig. 35 is a sectional view through the dies and blank on the line 35—35 of Fig. 34.
Figure 37:
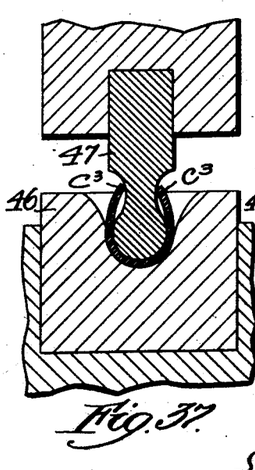
Fig. 37 is a similar view on the line 37—37 of Fig. 36.

The blank in the form shown in Fig. 32, having the parts heretofore designated $a^2$, $b^2$ and $c^2$ is now put in the cutting dies and the outline of the part $b^2$ is cut out to that shown in Fig. 33. The end $b^2$ is then put into a pair of dies 44 and 45 and curved up on its edges to form curved wings $c^3$, as indicated in Figs. 34 and 35. The previously formed portion $b^4$ is left at the center of the final shape desired so it does not have to be modified further.

Now this blank so formed is placed in a die 46 having a substantially semi-circular shaped cavity and operated on by a punch 47 having a cylindrical lower surface which curves up the edges $c^3$ of the blank against this punch and brings the concavo-convex portion $b^4$ previously described into continuous registration with the rest of the blank. This die is removed endwise by drawing the die relatively backwards along the blank, or vice versa, it being observed that the die is so shaped as to produce a tapered product.

Figure 38:
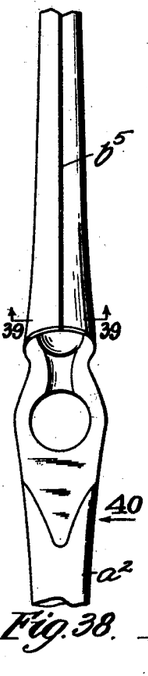
Figure 39:
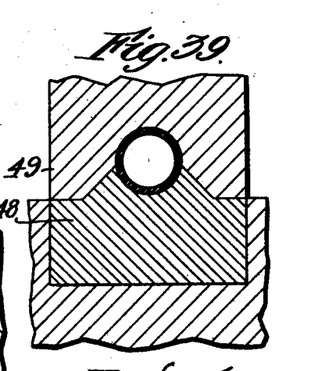
Fig. 39 is a similar sectional view on the line 39—39 of Fig. 38 showing the closing up of the guide to complete the circular shape.
Figure 40:
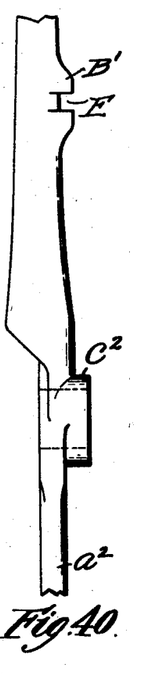
Fig. 40 is an edge view of the blank in the condition shown in Figs. 38 and 39.

The final shaping of this end is done in the dies 48 and 49 which have substantially semi-circular cavities tapering in diameter for bending up the article into a closed tubular form, as shown in Figs. 38 and 40. The edges are not brought into contact as a threading slot $b^5$ is desired between them. This produces the result shown in Fig. 45 and finishes the thread guide except for one additional machine operation and polishing.

Figure 41:
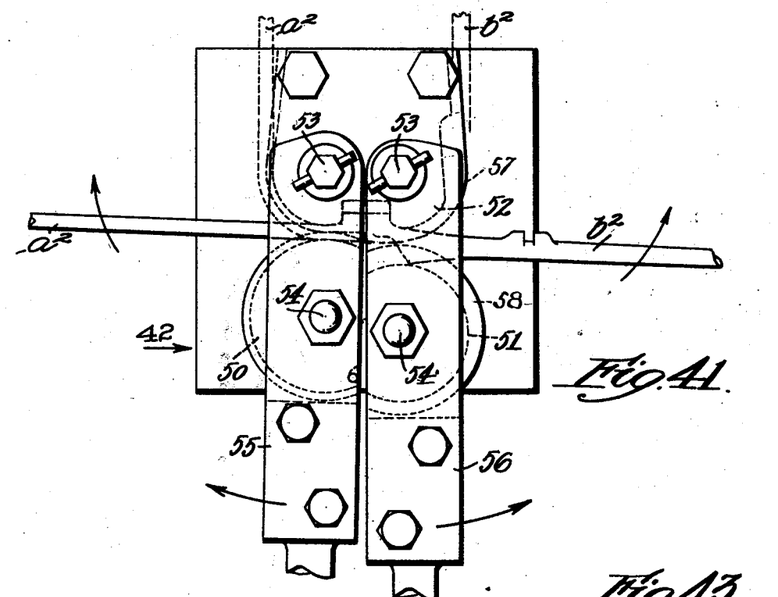
Fig. 41 is a reduced side view of a set of dies for bending up the blank at the crown to bring the thread guide portion and balance rod into parallel position.
Figures 42, 43:
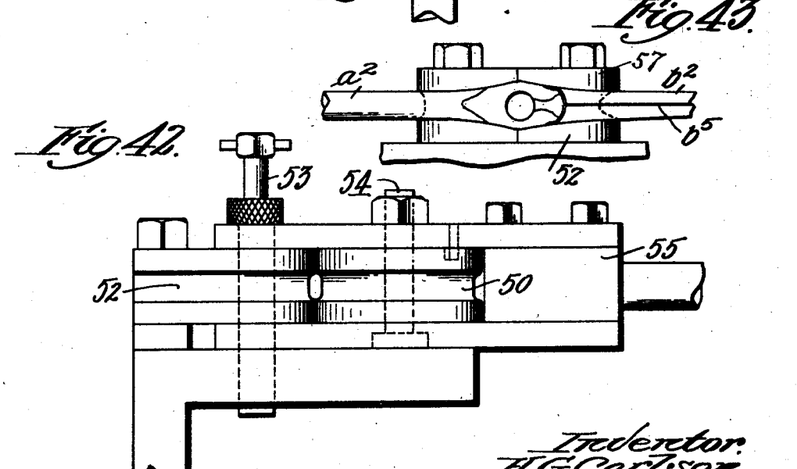
Fig. 42 is a side view looking into these dies, as indicated by the arrow 42 in Fig. 41.
Fig. 43 is an edge view of the upper pair of dies with the work in position.

Now the article is substantially in its final form except that the two arms $a^2$ and $b^2$ are located out flat in alignment with each other, as indicated in Fig. 41. For the purpose of bringing them into the right position they are put into a set of bending dies shown in that figure and in Figs. 42 and 43. These dies are in the form of arcuate rolls 50 and 51, and a stationary die 52, the former being mounted on two studs 54. These studs are located on two levers 55 and 56. These two levers are swung around their centers or studs 53 by hand in the direction of the arrows with the blank in position in the dies. They turn the blank around to the dotted line position to change the relative locations of the parts $a^2$ and $b^2$, as indicated in Fig. 41. This completes the metal bending, rolling and pressing operations on the article. To avoid slippage I prefer to place meshing gear segments 57 and 58 on the die 52 and roll 51.

Figures 45, 50:
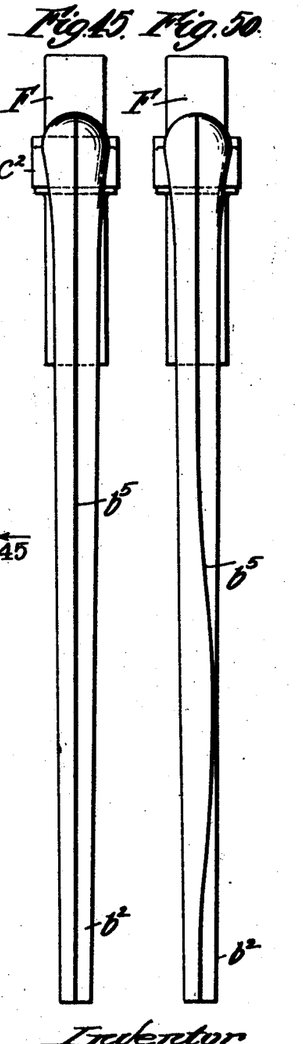
Fig. 45 is an edge view of the same, as indicated by the arrow 45 in Fig. 44 but taken before the thread guide is twisted.
Fig. 50 is a view similar to Fig. 45 showing the thread guide of the flier after the same has been twisted to throw the thread guiding slot out of a straight line.

It is now in the form shown in Figs. 44, 45 and 46 except that the central hub $c^2$ has not yet been threaded. This is done in any ordinary way and a previously threaded center bearing stem F is inserted. This is properly machined and finished to furnish a bearing for the flier and is properly located so that the arm $a^2$ will balance the thread guide $b^2$. It is provided with a transverse perforation $f$ therethrough and a pin G is inserted through it to engage the threads of the hub $c^2$ and hold the parts in position. In use this is carried on a spindle having a groove or notch for receiving the pin G so as to drive it positively.

It is not possible to leave the slot $b^5$ between the edges of the thread guide in the straight position shown in Fig. 45 because the thread would be easily dislodged from it, so this thread guide having a circular cross-section is twisted by holding its two ends and twisting its center so that this slot $b^5$ assumes the position shown in Fig. 50. This can be done at any stage after the thread guide is otherwise completed.

In this way it will be seen that a complete flier is produced, all of it except the stem F being formed of a single piece of metal operated on by various tools in the process but coming out in a uniform condition not requiring any machine finishing of any kind and perfectly balanced because after the tools have been once designed correctly, they will manufacture hundreds of thousands of these articles just alike. The hand work being eliminated, particularly the delicate balancing of the device, the cost of production on a large scale is very greatly reduced.

Although I have illustrated and described a particular sequence of steps I am aware of the fact that many departures can be made from this sequence and some of the operations described herein as separate ones can be combined in a single operation without departing from the scope of the invention as expressed in the claims.

Therefore I do not wish to be limited in these respects but what I do claim is:—

1. The method of making fliers for spinning and other machines which comprises cutting out a blank of flat metal with an end portion uniform in cross-section and having a width greater than its thickness, rolling it on edge between two grooved rolls to reduce its width and round its edges, then placing it flatwise between grooved rolls to reduce it to a substantially elliptical shape to constitute the balance rod, lengthening it in each operation, and then using this end of the blank as a handle and subjecting the other end to a series of rolling and die operations to form from that end the thread guide.

2. The method of making fliers for spinning and other machines which comprises cutting out a blank of flat metal, placing one end on edge between rolls to reduce its width and round its edges, then placing it flatwise between rolls to reduce it to a substantially elliptical shape, then, using this end of the blank as a handle, heating the blank and subjecting the opposite end thereof to the action of a pair of rolls to lengthen it, thin it and provide a concavo-convex portion thereon.

3. The method of making a flier for a spinning frame which consists in cutting out a blank from sheet metal, rolling out one end of the blank to form the balance rod, using that end as a handle and subjecting the other end to the action of rollers to thin it, widen it, and lengthen it, and at the same time forming an area of curved cross-section extending along that end of the blank at a point near the center and providing a projection extending from the convex portion thereof.

4. The method of making a flier for a spinning frame which consists in cutting out a blank from sheet metal, shaping one end of the blank to form the balance rod, heating the other end, rolling it out to thin, widen and lengthen it, forming an area of curved cross-section extending along that end of the blank at a point near the center, providing a projection extending from the convex portion thereof, lengthening out said projection, forming a transverse groove across it, and finally bending up this end to form a hollow thread guide, leaving said projection and groove on the outside to locate the ring end of the presser.

5. The method of making a flier for a spinning frame which consists in cutting out a blank from sheet metal, shaping one end of the blank to form the balance rod, subjecting the other end to the action of rollers to thin, widen, and lengthen it and at the same time forming an area of curved cross-section extending along that end of the blank at a point near the center, rolling out that end of the blank to the desired thickness, trimming its edges, bending the blank up into a cylindrical form with its opposite edges at a slight distance from each other to form a thread slot, and then bending the two ends of the blank over at right angles to form the thread guide and balance rod.

6. The method of forming the thread guide for a flier which consists in providing a flat blank, rolling it out, forming a longitudinal concave portion, pressing the blank to form concave wings at the opposite sides of the concave portion with the three concavities on the same side, then subjecting it to the action of dies to bend said wings up into a shape forming a continuous curve with said concave portion, and finally curving the wings over into a true cylindrical but tapering shape with their edges almost in contact to form the thread slot.

7. The method of forming the thread guide for a flier which consists in providing a flat blank, rolling it out thin at its edges, leaving a hollow projection near the inner end thereof, forming a transverse groove in said projection for receiving the eye end of a presser, forming a longitudinal concave portion from said groove to the end of that part of the blank, trimming off the edges of the blank, pressing the blank in dies to form concave wings at the opposite sides of the concave portion with the three concavities on the same side, then subjecting it to the action of dies to bend said wings up into a shape forming a continuous curve with said concave portion, and finally curving the wings over into a true cylindrical but tapering shape with their edges almost in contact to form the thread slot.

8. The method of forming the thread guide for a flier which consists in providing a flat blank, rolling it out thin at its edges, forming a concave portion at the end of one part of the blank, pressing the blank to form concave wings at the opposite sides of the concave portion, then subjecting it to the action of dies to bend said wings up into a shape forming a continuous curve with said concave portion, curving the wings over into a true cylindrical but tapering shape with their edges almost in contact to leave a thread guide slot, then holding the ends of the tapered circular blank and twisting it at the center to curve the slot.

9. The method of making a flier for a spinning frame which consists in cutting out a blank from sheet metal, forming a solid balance rod on one end, rolling out the other end to thin, widen and lengthen it, forming a thread guide of said other end, leaving said blank with a substantially circular portion at the center throughout said operations, forming a depression centrally in said center and forcing it out on the other side to constitute a cylinder, punching the end out of the cylinder, and reducing the interior to a cylindrical shape so as to form a cylindrical hollow hub at the center for the reception of a center bearing stem.

10. The method of making a flier which consists in cutting out a flat blank having a substantially circular center, a projection from one side thereof substantially uniform in cross-section and a projection on the other side of gradually lessening cross-section from said center to the end, rolling out the first named projection to a substantially elliptical form to provide the balance rod, rolling the projection on the other side to provide a cross-section circular but tapering to constitute a thread guide, perforating the center and forming it into a cylindrical hub, then subjecting the opposite ends to the action of a pair of swinging rollers to bend them around and bring the thread guide and the balance rod into parallel position.

11. The method of making a flier which consists in cutting out a flat blank having a substantially circular center, a projection from one side thereof substantially uniform in cross-section and a projection on the other side of gradually lessening cross-section from said center to the end, rolling out the first named projection to a transverse substantially elliptical form to provide the balance rod, hot rolling the projection on the other side to thin it out materially, subjecting it to a succession of cold rolling operations to reduce it to the desired thickness, trimming its edges to the necessary shape, curving up its edges to nearly meet and provide a cross-section circular but tapering to constitute a thread guide, perforating the center and forming it into a cylindrical hub, then placing the said hub against stationary surfaces having the desired curvature and subjecting the opposite ends to the action of a pair of swinging rollers to bend them around the stationary surfaces and bring the thread guide and the balance rod into parallel position.

12. The method of making a flier which consists in cutting out a flat blank having a substantially circular center, a projection from one side thereof substantially uniform in cross-section and a projection on the other side of gradually lessening cross-section from the center to the end, shaping the projection on one side to a substantially elliptical form to provide the balance rod, rolling the projection on the other side to reduce it to the desired thickness to constitute a thread guide, curving up its edges to nearly meet and provide a cross-section circular but tapering, perforating the center and forming it into cylindrical hub, then placing the said hub against stationary surfaces having the desired curvature and subjecting the opposite ends to the action of a pair of swinging rollers to bend them around the stationary surfaces and bring the thread guide and the balance rod into parallel position, threading the interior of said hub and fixing within it a previously prepared center bearing stem.

13. The method of making a flier which consists in rolling out a balance rod on one end of a blank, rolling out the other end flat with a tapering longitudinal concavo-convex formation, bending into curved wings the flat edges at both sides of the concavo-convex portion, and then shaping said wings to a continuous curve with respect to the central concavo-convex form, to form the thread guide.

14. The method of making a flier which consists in cutting out a flat blank having a projection from each side thereof, shaping the projection on one side to provide the balance rod, rolling the projection on the other side to constitute a thread guide, perforating the center and forming it into a cylindrical hub, then placing the said hub against stationary surfaces having the desired curvature and subjecting the opposite ends to the action of a pair of swinging rollers to bend them around the stationary surfaces and bring the thread guide and the balance rod into parallel position, threading the interior of said hub and fixing within it a previously prepared center bearing stem.

In testimony whereof I have hereunto affixed my signature.

HJALMAR G. CARLSON.